(12) United States Patent
Lee et al.

(10) Patent No.: US 6,732,371 B1
(45) Date of Patent: May 4, 2004

(54) APPARATUS AND METHOD FOR GUIDING BROADCASTING INFORMATION OF TV

(75) Inventors: Jae Kyung Lee, Taegu-shi (KR); Myong Hwa Ko, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/534,089

(22) Filed: Mar. 23, 2000

(30) Foreign Application Priority Data

Mar. 25, 1999 (KR) ........................................ 1999-10318

(51) Int. Cl.⁷ .......................... G06F 3/00; G06F 13/00; H04N 5/445; H04N 5/45
(52) U.S. Cl. ............................. 725/41; 725/42; 725/43; 725/44; 725/56; 348/563; 348/564; 348/565
(58) Field of Search ............................. 725/41, 42, 43, 725/44, 46, 47, 56; 348/563, 564, 565, 566, 567

(56) References Cited

U.S. PATENT DOCUMENTS

| | | | | |
|---|---|---|---|---|
| 5,801,785 A | * | 9/1998 | Crump et al. ................ 348/563 |
| 6,115,080 A | * | 9/2000 | Reitmeier .................... 348/731 |
| 6,177,931 B1 | * | 1/2001 | Alexander et al. .......... 345/721 |
| 6,239,794 B1 | * | 5/2001 | Yuen et al. .................... 725/41 |
| 6,246,442 B1 | * | 6/2001 | Harada et al. ............... 348/569 |
| 6,314,570 B1 | * | 11/2001 | Tanigawa et al. ............. 725/40 |
| 2002/0070958 A1 | * | 6/2002 | Yeo et al. .................... 345/723 |

* cited by examiner

Primary Examiner—John Miller
Assistant Examiner—Michael W. Hoye
(74) Attorney, Agent, or Firm—Fleshner & Kim, LLP

(57) ABSTRACT

An apparatus and method for guiding broadcasting information of a TV is disclosed, in which various and detailed information is provided to permit a user to easily identify a program and fulfill the user's visual desire. The method for guiding broadcasting information of a TV includes the steps of displaying a program table for each broadcasting station and each time in accordance with a broadcasting guide key input by a user, displaying both a PIP video of a current broadcasting program in a channel selected by the user from the program table and one of a PIP video of a previous broadcasting program in the same channel, a PIP video of a next program in the same channel, and PIP videos of previous and next programs in the same channel, and displaying both a PIP video of a broadcasting program in a channel selected by the user from the program table and one of a PIP video of a broadcasting program in an upper channel at equal time, a PIP video of a broadcasting program in a lower channel at equal time, and PIP videos of broadcasting programs in the upper and lower channels at equal time. Thus, it is possible to fulfill a visual desire of the user. Also, the user can easily recognize the program. Furthermore, since the user can select its desired program and view it on a broadcasting information guide screen, convenience can be given to the user.

15 Claims, 12 Drawing Sheets

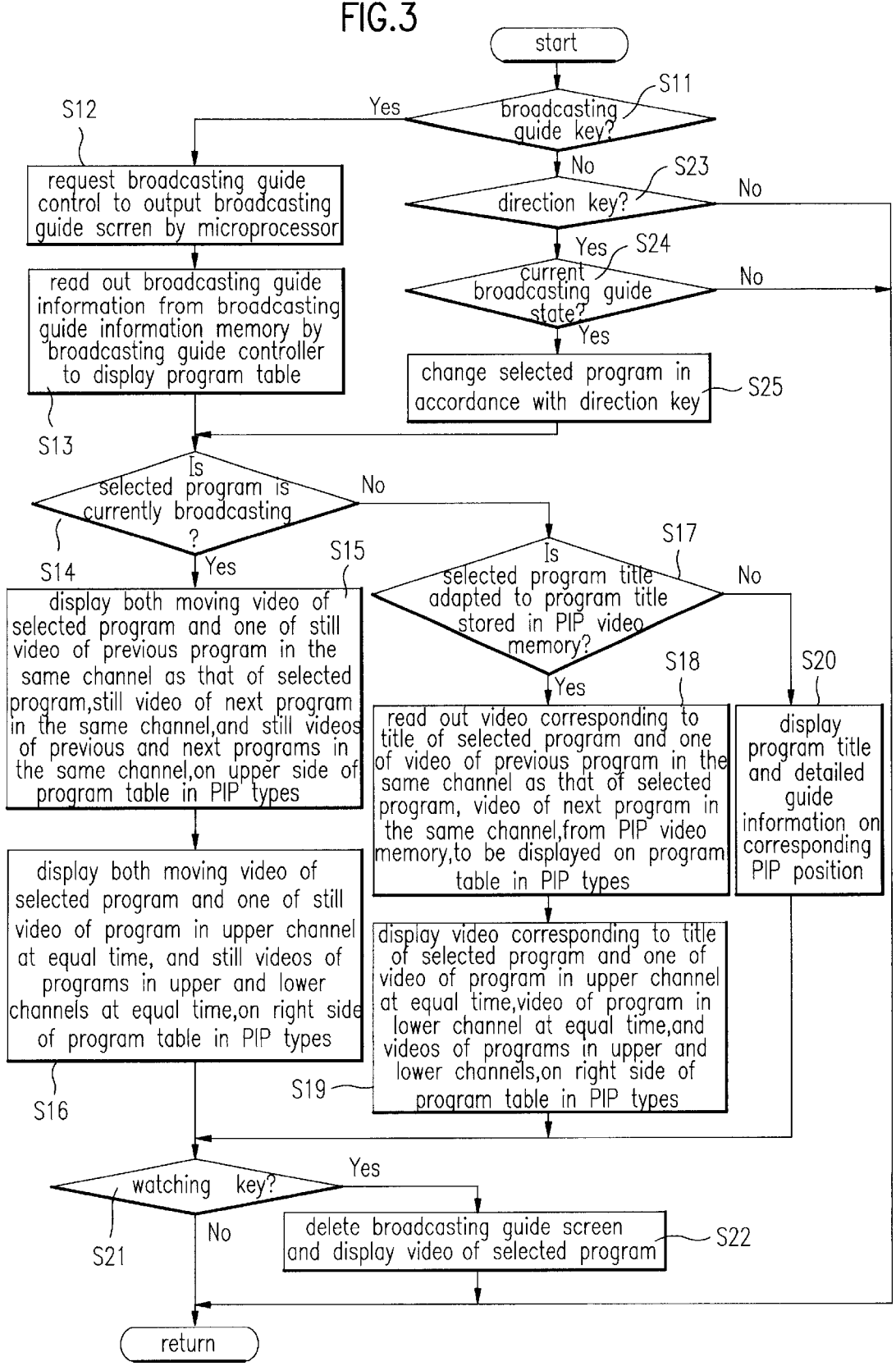

APPARATUS AND METHOD FOR GUIDING BROADCASTING INFORMATION OF TV

BACKGROUND OF THE INVENTION

1. Field of the Invention

The present invention relates to a TV, and more particularly, to an apparatus and method for guiding broadcasting information of a TV.

2. Description of the Related Art

With converting an analog mode to a satellite broadcasting mode and a digital mode in a TV technology, the TV related technologies are rapidly being developed quantitatively as well as qualitatively. Particularly, the digital mode which can manage more channels than the analog mode will permit the number of broadcasting channels geometrically. Accordingly, a user is not able to utilize various channels with several channels or broadcasting station names only. The user is not able to easily watch its desired broadcasting program, either. Thus, recent TV technologies are provided with a broadcasting information guide function for displaying broadcasting program information for each channel provided from the broadcasting station on a screen when a user desires to do so, to easily identify and select each broadcasting program. Such a broadcasting information guide function is essentially required to cope with development of broadcasting related technologies.

A related art broadcasting information guide function extracts character broadcasting guide information transmitted from the broadcasting station together with a broadcasting signal, for example, a Korean Broadcasting Program System (KBPS) signal in Korea, and processes a series of video signals to simply display the title and time of a program in a character type.

However the related art broadcasting information guide function has several problems.

That is, since the title and time of the program are simply displayed in a character type, the user cannot obtain its desired program information if the user does not know a broadcasting program exactly. In addition, since a character type is only displayed, various types such as a dynamic type are not displayed. As a result, a visual desire of the user cannot be fulfilled.

SUMMARY OF THE INVENTION

Accordingly, the present invention is directed to an apparatus and method for guiding broadcasting information of a TV, that substantially obviates one or more of the problems due to limitations and disadvantages of the related art.

An object of the present invention is to provide an apparatus and method for guiding broadcasting information of a TV, in which various and detailed information is provided to permit a user to easily identify a program and fulfill the user's visual desire.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for guiding broadcasting information of an analog TV having a video processor according to the present invention includes a broadcasting guide information memory for storing broadcasting guide information, a picture in picture (PIP) video memory for storing PIP video information and titles of broadcasting programs for each channel, a PIP processor for performing input/output of information stored in the PIP video memory and PIP video processing, and a broadcasting guide controller for decoding broadcasting guide information contained in a broadcasting signal to be stored in the broadcasting guide information memory, controlling the PIP processor to process broadcasting guide video information among video signals in a PIP type to be stored in the PIP video memory, and controlling the broadcasting guide information memory, the PIP processor and the video processor in accordance with broadcasting guide order of the user to display broadcasting guide information containing characters and videos on a screen.

In another aspect, an apparatus for guiding broadcasting information of a digital TV having a video decoder and an NTSC/PAL encoder according to the present invention includes a broadcasting guide information memory for storing broadcasting guide information, a PIP video memory for storing PIP video information and titles of broadcasting programs for each channel, a PIP processor for performing input/output of information stored in the PIP video memory and PIP video processing, and a broadcasting guide controller for decoding broadcasting guide information contained in a broadcasting signal to be stored in the broadcasting guide information memory, controlling the PIP processor to process broadcasting guide video information among video signals in a PIP type to be stored in the PIP video memory, and controlling the broadcasting guide information memory, the PIP processor, the video decoder and the NTSC/PAL encoder in accordance with broadcasting guide order of the user to display broadcasting guide information containing characters and videos on a screen.

In still another aspect, an apparatus for guiding broadcasting information of a digital TV having a video decoder and an NTSC/PAL encoder according to the present invention includes the steps of displaying a program table for each broadcasting station and each time in accordance with a broadcasting guide key input by a user, and displaying both a PIP video of a current broadcasting program in a channel selected by the user from the program table and one of a PIP video of a previous broadcasting program in the same channel, a PIP video of a next program in the same channel, and PIP videos of previous and next programs in the same channel.

In further another aspect, a method for guiding broadcasting information of a TV according to the present invention includes the steps of displaying a program table for each broadcasting station and each time in accordance with a broadcasting guide key input by a user, and displaying both a PIP video of a broadcasting program in a channel selected by the user from the program table and one of a PIP video of a broadcasting program in an upper channel at equal time, a PIP video of a broadcasting program in a lower channel at equal time, and PIP videos of broadcasting programs in the upper and lower channels at equal time.

In further still another aspect, a method for guiding broadcasting information of a TV according to the present invention includes the steps of displaying a program table and PIP videos for each channel which is currently broadcasting in accordance with a broadcasting guide key input by a user, and displaying detailed broadcasting guide information of a program selected by the user from the program table.

In other aspect, a method for guiding broadcasting information of a TV according to the present invention includes the steps of displaying a program table for each channel which is currently broadcasting in accordance with a broadcasting guide key input by a user, and displaying either PIP videos of programs in an another channel at equal time to a program in a channel selected by the user in the program table, or detailed broadcasting guide information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart showing a method for guiding broadcasting information of a TV according to the third embodiment of the present invention;

DETAILED DESCRIPTION OF THE PREFERRED EMBODIMENTS

Reference will now be made in detail to the preferred embodiments of the present invention, examples of which are illustrated in the accompanying drawings.

An apparatus for guiding broadcasting information of a TV according to the first and second embodiments of the present invention will be described.

First Embodiment

An apparatus for guiding broadcasting information according to the first embodiment of the present invention is applied to an analog TV.

Figure 1:
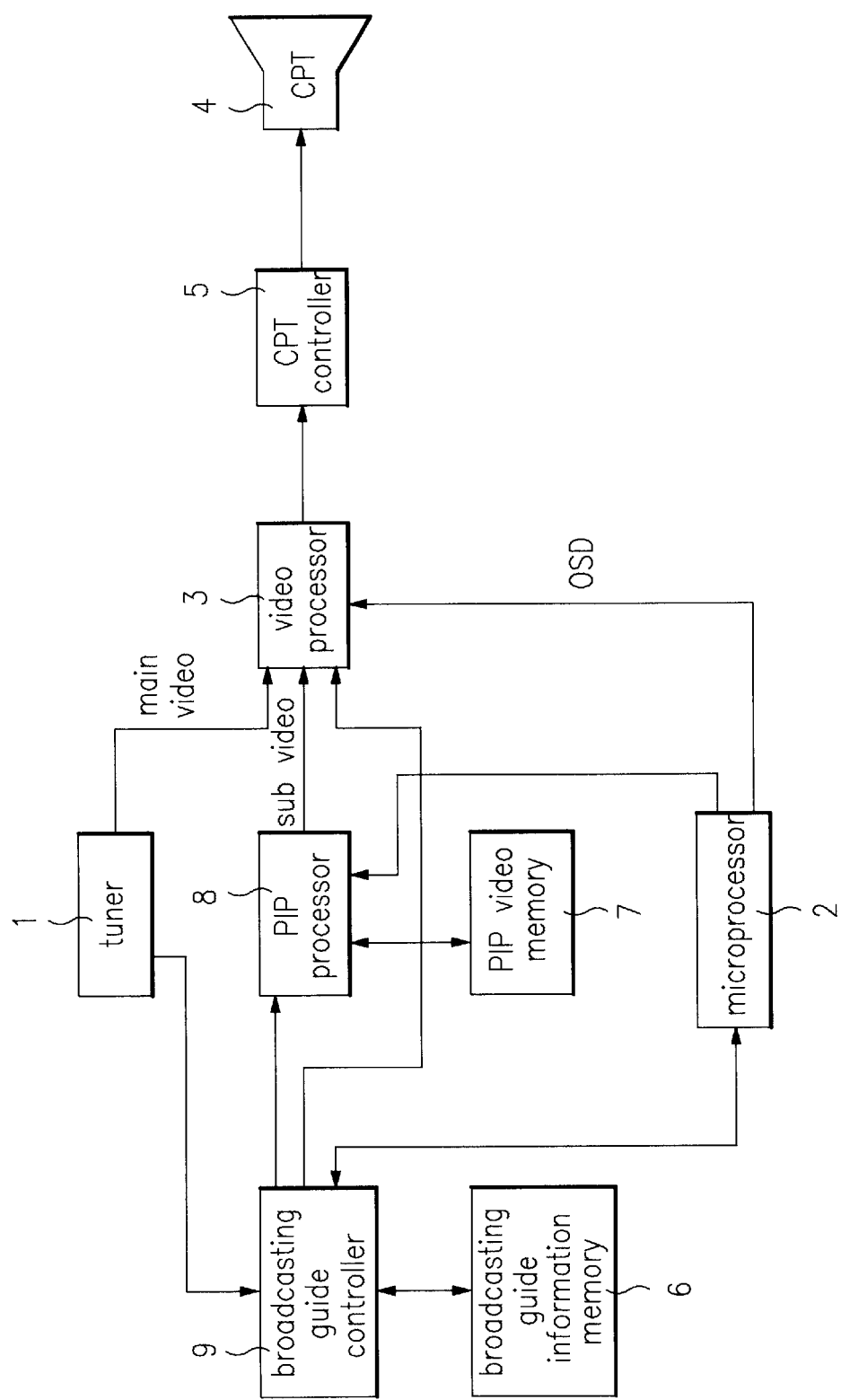
FIG. 1 is a block diagram showing an apparatus for guiding broadcasting information of a TV according to the first embodiment of the present invention.

As shown in FIG. 1, the apparatus for guiding broadcasting information according to the first embodiment of the present invention includes a tuner 1 for tuning a main video signal for broadcasting and a sub video signal for PIP, a microprocessor 2 for controlling the overall system, a video processor 3 for processing a video signal to display an input signal on a screen, a color picture tube(CPT) 4, a CPT controller 5 for controlling the display operation of the CPT 4, a broadcasting guide information memory 6 for storing broadcasting guide information, a PIP video memory 7 for storing PIP video information and titles of broadcasting programs for each channel, a PIP processor 8 for performing input/output of information stored in the PIP video memory 7 and PIP video processing, and a broadcasting guide controller 9 for decoding broadcasting guide information contained in a broadcasting signal tuned by tuner 1 to be stored in the broadcasting guide information memory 6, controlling the PIP processor 8 to process broadcasting guide video information among video signals in a PIP type to be stored in the PIP video memory 7, and controlling the broadcasting guide information memory 6, the PIP processor 8 and the video processor 3 in accordance with broadcasting guide order of the user to display broadcasting guide information containing characters and videos on a screen.

The PIP video memory 7 stores a main video of a program for each channel and a title of a corresponding program therein.

The operation of the aforementioned apparatus for guiding broadcasting information according to the first embodiment of the present invention will be described below.

The broadcasting guide controller 9 decodes broadcasting guide character information among broadcasting signals tuned by the tuner 1 and stores the broadcasting guide character information in the broadcasting guide information memory 6. The broadcasting guide controller 9 also extracts video information for displaying PIP videos among the broadcasting signals, and controls the PIP processor 8 to perform PIP video processing and to store PIP processed video information in the PIP video memory 7.

Meanwhile, if the user pushes a broadcasting guide key of a TV body or remote controller, a broadcasting guide key signal is transmitted to the broadcasting guide controller 9 through the microprocessor 2. Subsequently, the broadcasting guide controller 9 reads the broadcasting guide character information from the broadcasting guide information memory 6 and outputs the same to the video processor 3. The broadcasting guide controller 9 also controls the PIP processor 8 to output broadcasting guide video information, i.e., PIP video information, to the video processor 3.

Thus, broadcasting guide character information and PIP information are processed as video signals through the video processor 3 and then displayed on the CPT 4 under the video control of the CPT controller 5.

Second Embodiment

An apparatus for guiding broadcasting information according to the second embodiment of the present invention is applied to a digital TV.

Figure 2:
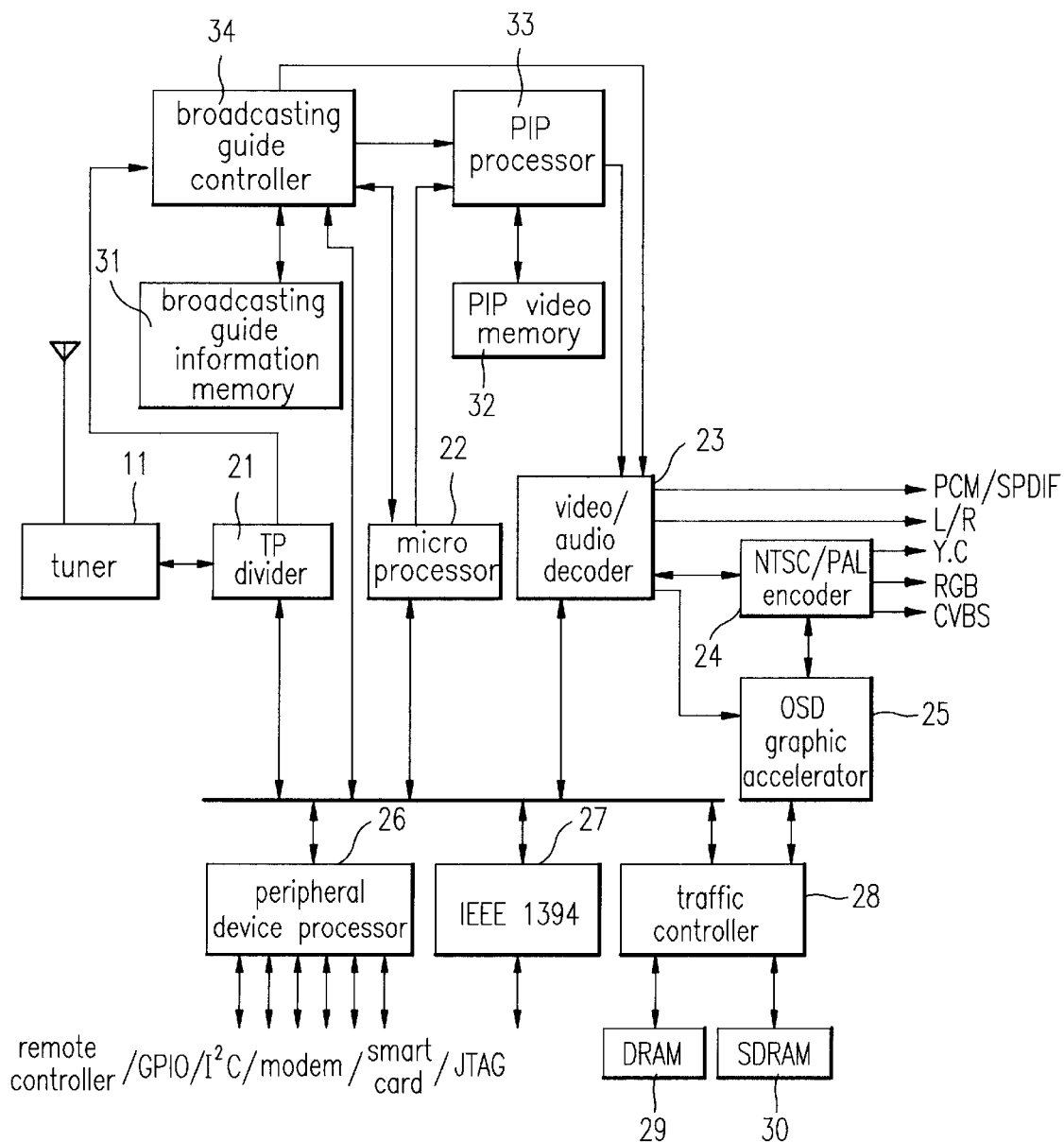
FIG. 2 is a block diagram showing an apparatus for guiding broadcasting information of a TV according to the second embodiment of the present invention.

As shown in FIG. 2, the apparatus for guiding broadcasting information according to the second embodiment of the present invention includes a tuner 11, a transport packet(TP) divider 21, a microprocessor 22, a video/audio decoder 23, an NTSC/PAL encoder 24, an on-screen display(OSD) graphic accelerator 25, a peripheral device processor 26, an IEEE1394 27, a DRAM 29, an SRAM 30, a traffic controller 28, a broadcasting guide information memory 31, a PIP video memory 32, a PIP processor 33, and a broadcasting guide controller 34.

The tuner 11 tunes and demodulates an RF signal received through an antenna. The TP divider 21 divides transport packet data QPSK-modulated and transmitted from a transmitter into video, audio, and additional information. The microprocessor 22 controls the overall system. The video/audio decoder 23 decodes video and audio signals. The NTSC/PAL encoder 24 encodes a digital video signal in RGB, Y/C or CVBS type capable of being displayed on a screen. The peripheral device processor 26 accesses a remote controller, GPIO, a smart card, and a modem through an external input terminal to interface various broadcasting information and user related information. The DRAM 29 and the SRAM 30 store application software data and OSD data, respectively. The traffic controller 28 controls flow of an overall digital signal and memory access operation of the SRAM 30. The broadcasting guide information memory 31 stores broadcasting guide information. The PIP video memory 32 stores PIP video information and titles of broadcasting programs for each channel. The PIP processor 33 performs input/output of information of the PIP video memory 32 and PIP video processing. The broadcasting guide controller 34 decodes broadcasting guide information contained in a broadcasting signal tuned by the tuner 11 and stores the broadcasting guide information in the broadcasting guide information memory 31. The broadcasting guide controller 34 controls the PIP processor 33 to perform PIP video processing and to store PIP processed video information in the PIP video memory 32. The broadcasting guide controller 34 also controls the broadcasting guide information memory 31, the PIP processor 33, the video/audio decoder 23, and the NTSC/PAL encoder 24 to display broadcasting guide information containing characters and videos.

The operation of the aforementioned apparatus for guiding broadcasting information according to the second embodiment of the present invention will be described below.

The broadcasting guide controller 34 decodes broadcasting guide character information contained in additional information among video, audio and additional information divided by the TP divider 21 and stores the broadcasting guide character information in the broadcasting guide information memory 31. The broadcasting guide controller 34 also extracts video information for displaying PIP videos, and controls the PIP processor 33 to perform PIP video processing and to store PIP processed video information in the PIP video memory 32.

Meanwhile, if the user pushes a broadcasting guide key of a TV body or remote controller, a broadcasting guide key signal is transmitted to the broadcasting guide controller 34 through the microprocessor 22. Subsequently, the broadcasting guide controller 34 reads out broadcasting guide character information from the broadcasting guide information memory 31 and outputs the same to the video/audio decoder 23. The broadcasting guide controller 34 also controls the PIP processor 33 to read broadcasting guide video information, i.e., PIP video information and to output the same to the video/audio decoder 23.

Thus, broadcasting guide character information and PIP video information are decoded by the video/audio decoder 23 under the control of the broadcasting guide controller 34 and then encoded by the NTSC/PAL encoder 24 to be displayed on the screen.

Methods for broadcasting guide information of a TV according to the third, fourth and fifth embodiments of the present invention will be described.

The apparatuses for guiding broadcasting information according to the first and second embodiments are different from each other in signal processing but their operations are performed by the same algorithm. Therefore, the methods for broadcasting guide information according to the third, fourth and fifth embodiments of the present invention will be described based on the apparatus for guiding broadcasting information according to the first embodiment of the present invention.

Third Embodiment

The method for guiding broadcasting information of a TV according to the third embodiment of the present invention will be described with reference to FIG. 3.

If a user pushes a broadcasting guide key of a TV body or remote controller, the microprocessor 2 determines whether or not a key signal is input (step S11). If the key signal is input, the microprocessor 2 requests the broadcasting guide controller 9 to output a broadcasting guide screen (step S12).

Subsequently, the broadcasting guide controller 9 reads out broadcasting guide information stored from the broadcasting guide information memory 6 and, as shown in FIGS. 4a, 4b, 4c, 4d, and 4e, displays a program table for arranging broadcasting station names for each channel and program titles for each time using an OSD function (step S13).

Figure 4A:
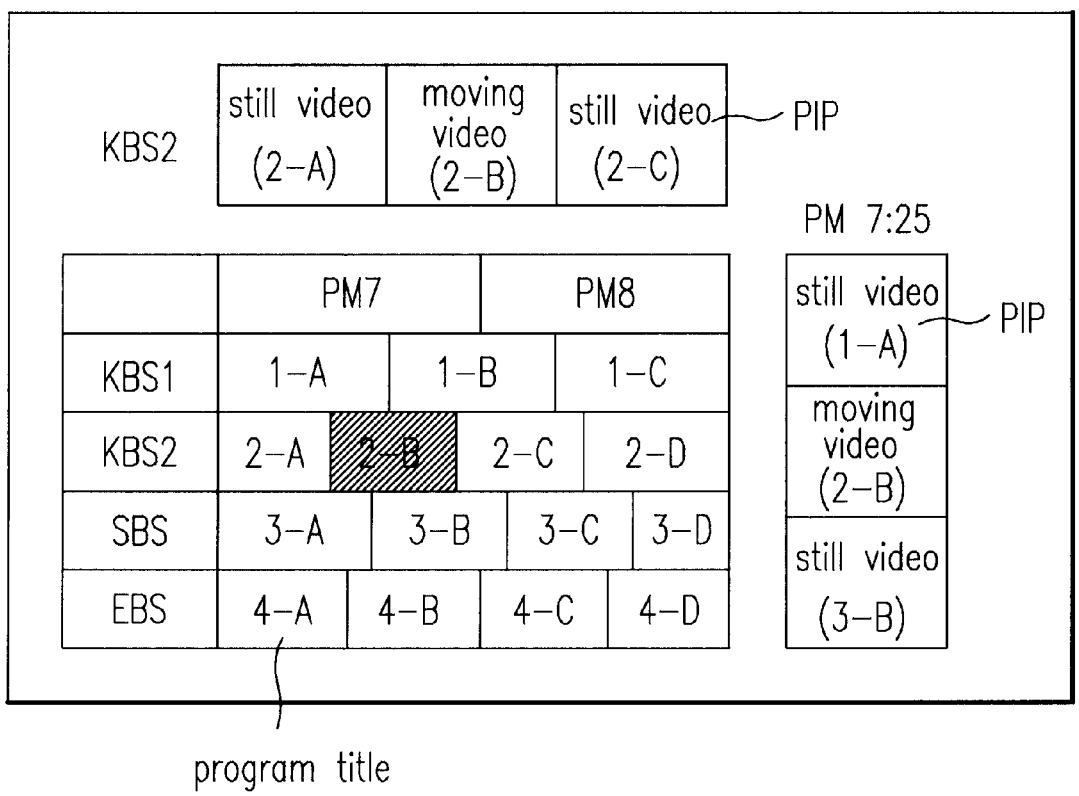
FIGS. 4a to 4e show broadcasting guide screens of FIG. 3.
Figure 4B:
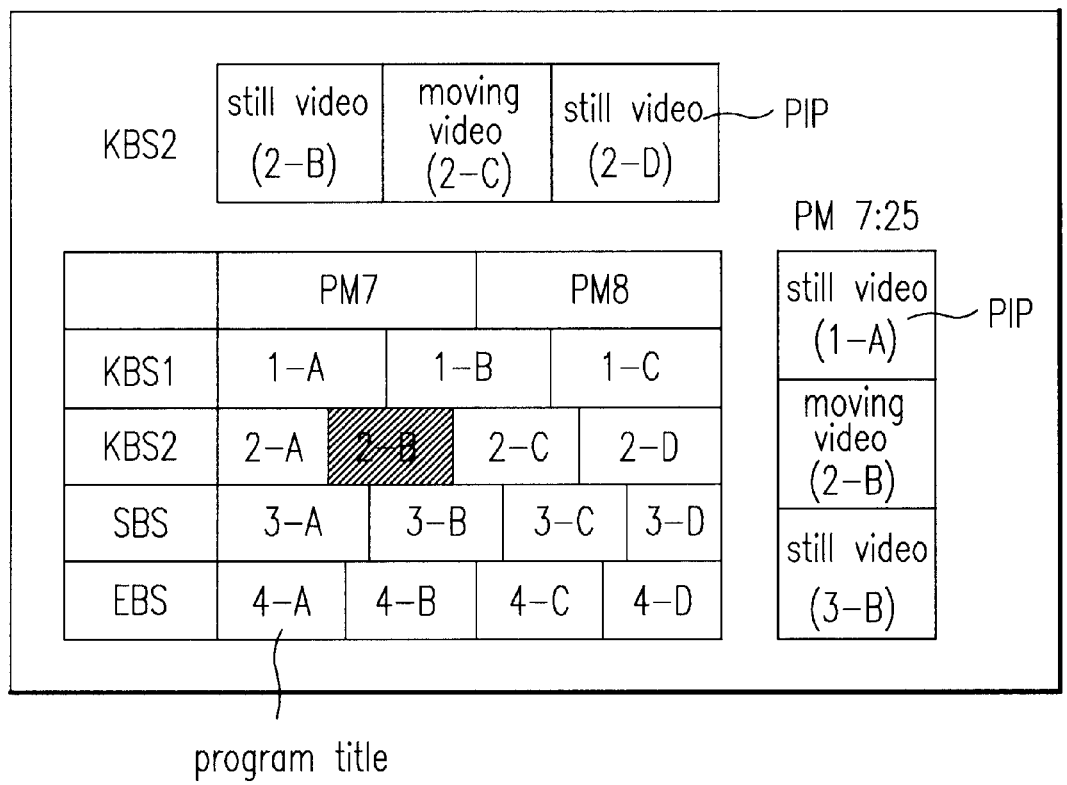
Figure 4C:
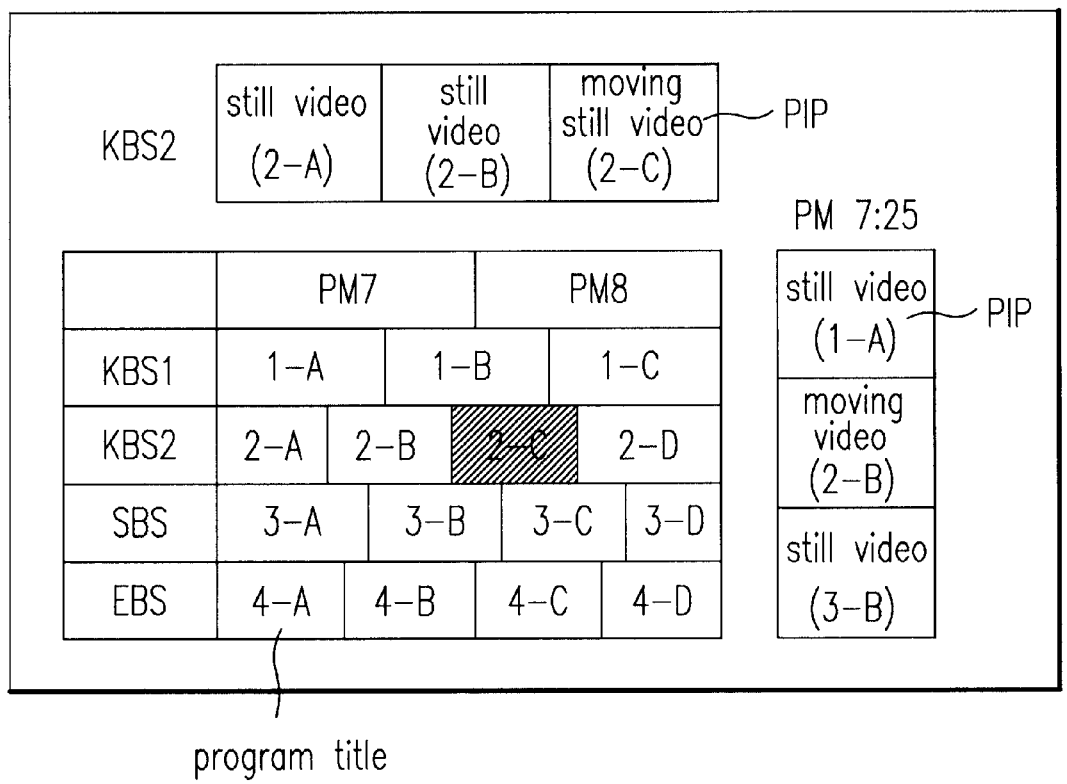

The microprocessor 2 determines whether or not a program selected by the user from the program table is currently broadcasting (step S14). If the selected program is currently broadcasting, the tuner 1 tunes the selected program to display a moving video of the selected program on an upper portion of the program table. The moving video is displayed in a PIP type as shown in FIG. 4a. Still videos of previous and next programs in the same channel as that of the selected program are displayed at both sides of the moving video in PIP types by reading out from the PIP video memory 7 and being processed through the PIP processor 8 (step S15). Furthermore, as an another example of the PIP at the step S15, the selected program is tuned by the tuner 1 to display the moving video thereof on the upper portion of the program table in a PIP type, and still videos of previous and next programs in the same channel as that of the selected program are displayed on a right side of the moving video, as shown in FIG. 4b. Alternatively, as shown in FIG. 4c, the selected program is tuned by the tuner 1 to display the moving video thereof on the upper portion of the program table in a PIP type, and still videos of previous and next programs in the same channel as that of the selected program are displayed at a left side of the moving video.

There are two methods for producing PIP videos used as the still videos.

First, if the broadcasting station transmits main videos of programs for each channel, PIP videos are produced by storing the main videos.

Second, programs of a required channel are sequentially tuned by the tuner 1 and moment videos for each program are stored in a memory together with their corresponding titles. Titles of the programs stored in the memory are periodically compared with actual program titles contained in broadcasting information. If there are programs between the program titles stored in the memory and the actual program titles, which are not adapted to each other, it is determined that the programs are ended. Thus, the information stored in the memory, such as the program titles, is renewed in such a manner that a video and a title of the corresponding program are deleted, and a video and a title of a new program are stored in the memory.

Figure 4D:
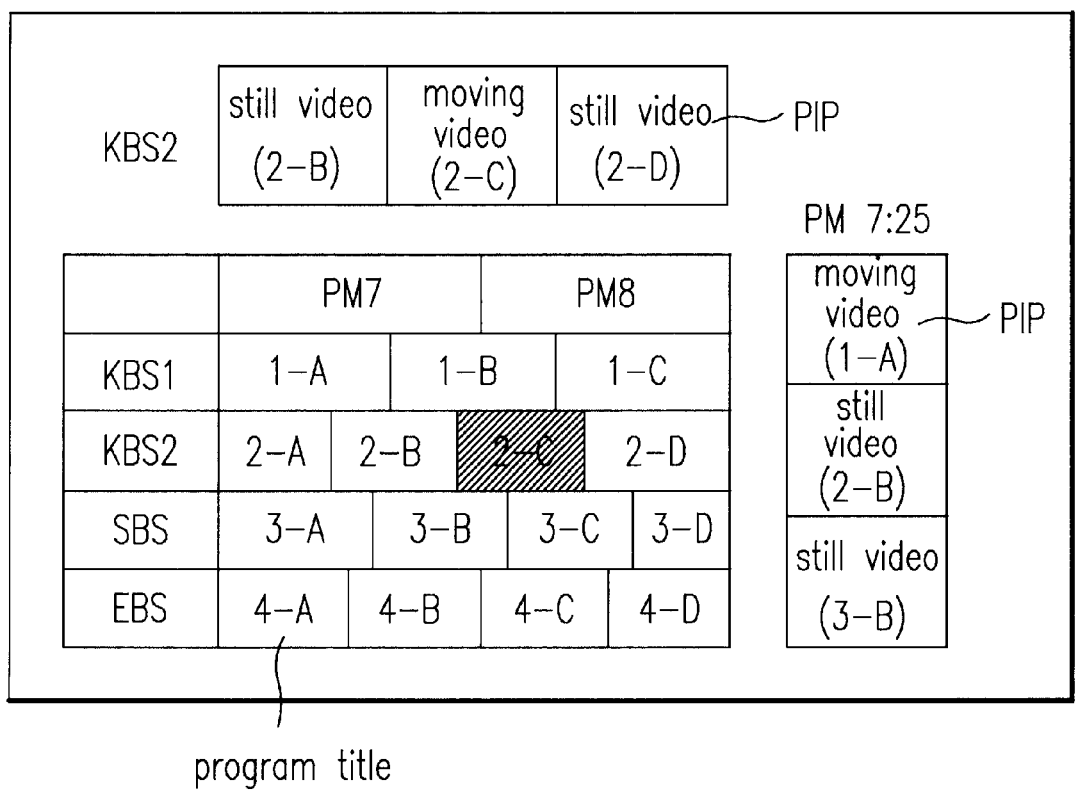
Figure 4E:
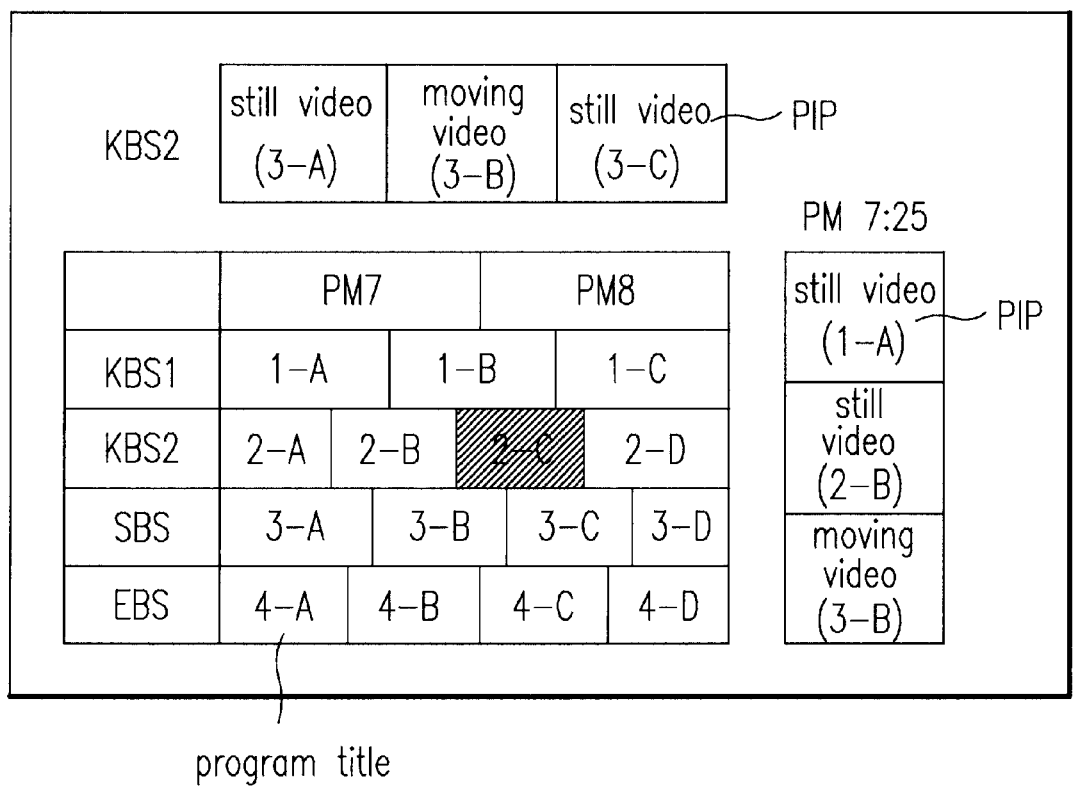

Subsequently, the selected program is tuned by the tuner 1 to display the moving video of the selected program on the right side of the program table in a PIP type, and still videos of higher and lower channel programs at equal time are displayed on and below the moving video in PIP types by being read out from the PIP video memory 7 and being processed through the PIP processor 8 (step S16). Furthermore, as an another example of the PIP at the step S16, the selected program is tuned by the tuner 1 to display the moving video thereof on the right side of the program table in a PIP type, and still videos of higher and lower channel programs at equal time are displayed on the moving video, as shown in FIG. 4d. Alternatively, as shown in FIG. 4e, the selected program is tuned by the tuner 1 to display the moving video thereof on the right side of the program table in a PIP type, and still videos of upper and lower channel programs at equal time are displayed below the moving video.

Meanwhile, as a result of the step S14, if the selected program is not currently broadcasting, the microprocessor determines whether or not the selected program title is adapted to the program title stored in the PIP video memory 7 (step S17). If the selected program title is adapted to the program title stored in the PIP video memory 7, the microprocessor reads out PIP video information of a program selected at current time and, PIP video information of two programs in the same channel at previous time or PIP video information of two programs in the same channel at next time, from the PIP video memory 7, and processes the video signals through the PIP processor 8 to be displayed in the same manner as the step S15 (step S18). However, all PIP videos are video information stored in the PIP video memory 7, they are displayed as still videos.

The microprocessor reads out PIP video information of a currently selected program and, PIP video information of two programs in higher and lower channels at equal time or PIP video information two programs at equal time, from the PIP video memory 7, and processes the video signals through the PIP processor 8 to be displayed in the same manner as the step S16 (step S19). However, all PIP videos are video information stored in the PIP video memory 7, they are displayed as still videos.

Meanwhile, as a result of the step S17, if the selected program title is not adapted to the program title stored in the PIP video memory 7, the microprocessor displays program titles and detailed guide information such as story information of the program on a corresponding PIP (step S20).

Subsequently, it is determined that a watching key is input (step S21). If the watching key is input, a broadcasting guide screen, i.e., a program list and a PIP video are deleted and a video of a channel selected by the user is displayed (step S22).

At this time, if the program of the channel selected by the user is not currently broadcasting, an error message such as "not currently broadcasting program" or "not available" is output.

Meanwhile, as a result of the step S11, if a direction key is input instead of a broadcasting guide key (step S23) and a current broadcasting guide screen is displayed (step S24), the selected program is changed to be adapted to the direction key (step S25).

Fourth Embodiment

The method for guiding broadcasting information of a TV according to the fourth embodiment of the present invention will be described with reference to FIG. 5.

Figure 5:
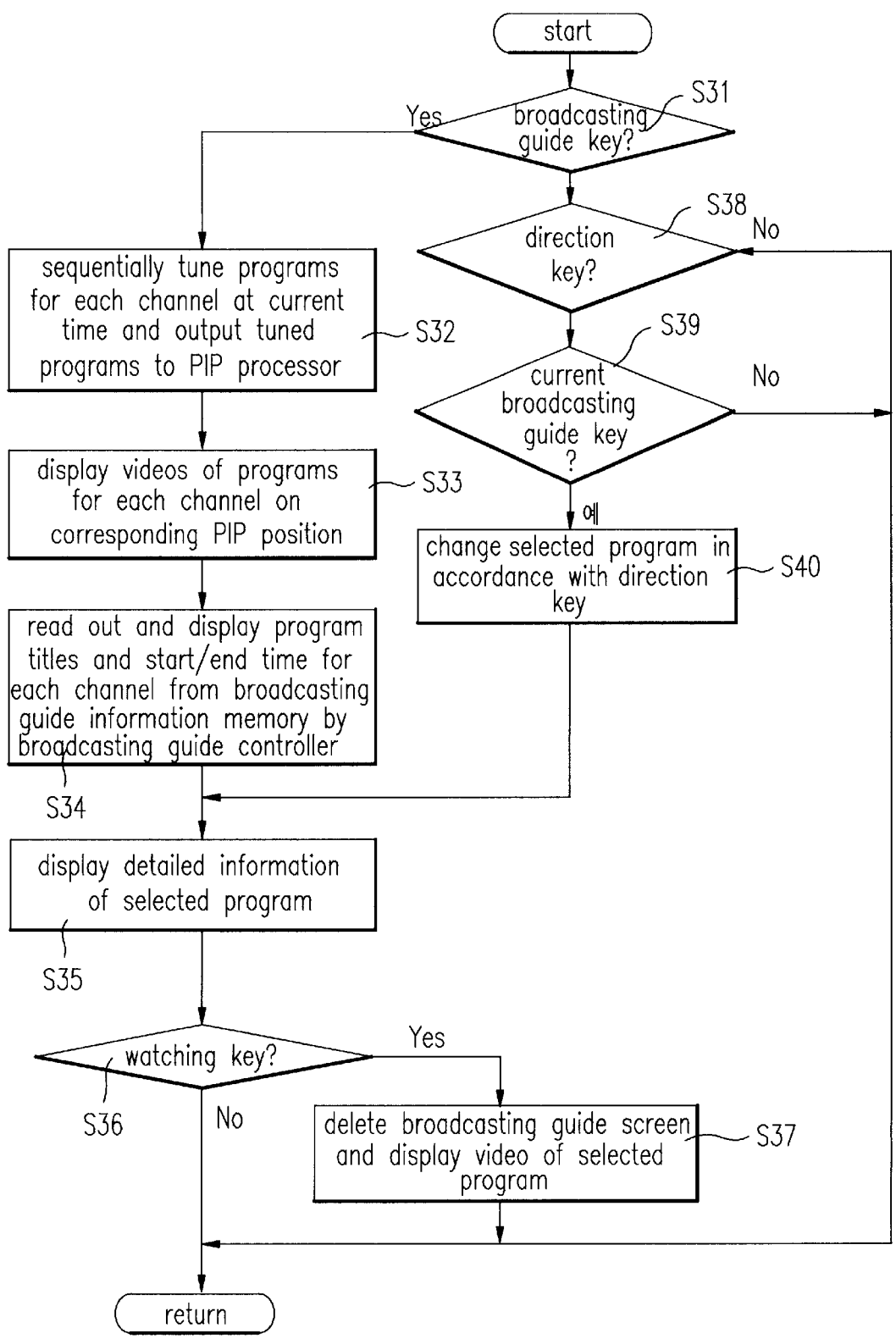
FIG. 5 is a flow chart showing a method for guiding broadcasting information of a TV according to the fourth embodiment of the present invention.
Figure 6:
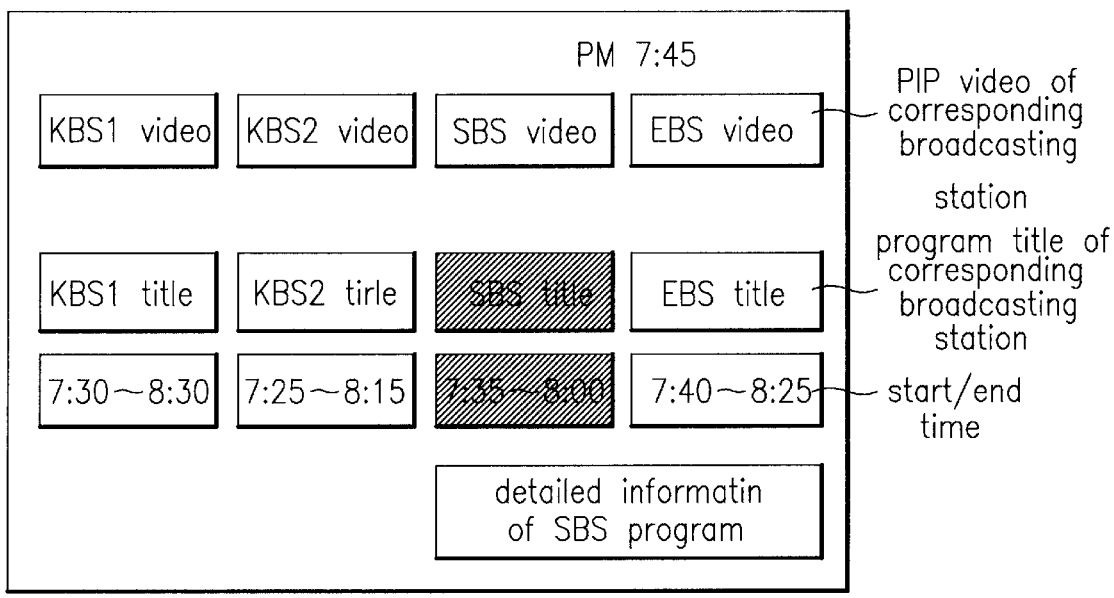
FIG. 6 shows a broadcasting guide screen of FIG. 5.

As shown in FIG. 5, it is determined that a broadcasting guide key is input (step S31). If the broadcasting guide key is input, the broadcasting guide controller 9 outputs programs for each channel at current time to the PIP processor 8 to sequentially tune them (step S32).

Subsequently, the PIP processor 8 processes signals of moment videos of a corresponding program to be displayed on a corresponding position in PIP types (step S33).

The broadcasting guide controller 9 reads out titles and start/end time of programs for each channel from the broadcasting guide information memory 6 to be displayed below a corresponding PIP video (step S34).

Then, detailed information (for example, story information) of a program selected by the user among the programs is displayed below the position of the titles and start/end time of the programs (step S35).

At this time, the program selected by the user among the PIP videos is displayed in a moving video. It is then determined that the watching key is input (step S36). If the watching key is input, the broadcasting guide screen is deleted and a video of the corresponding program is displayed (step S37).

Meanwhile, as a result of the step S31, if a direction key is input instead of a broadcasting guide key (step S38) and a current broadcasting guide screen is displayed (step S39), the selected program is changed to be adapted to the direction key (step S40).

Fifth Embodiment

The method for guiding broadcasting information of a TV according to the fifth embodiment of the present invention will be described with reference to FIG. 7.

Figure 7:
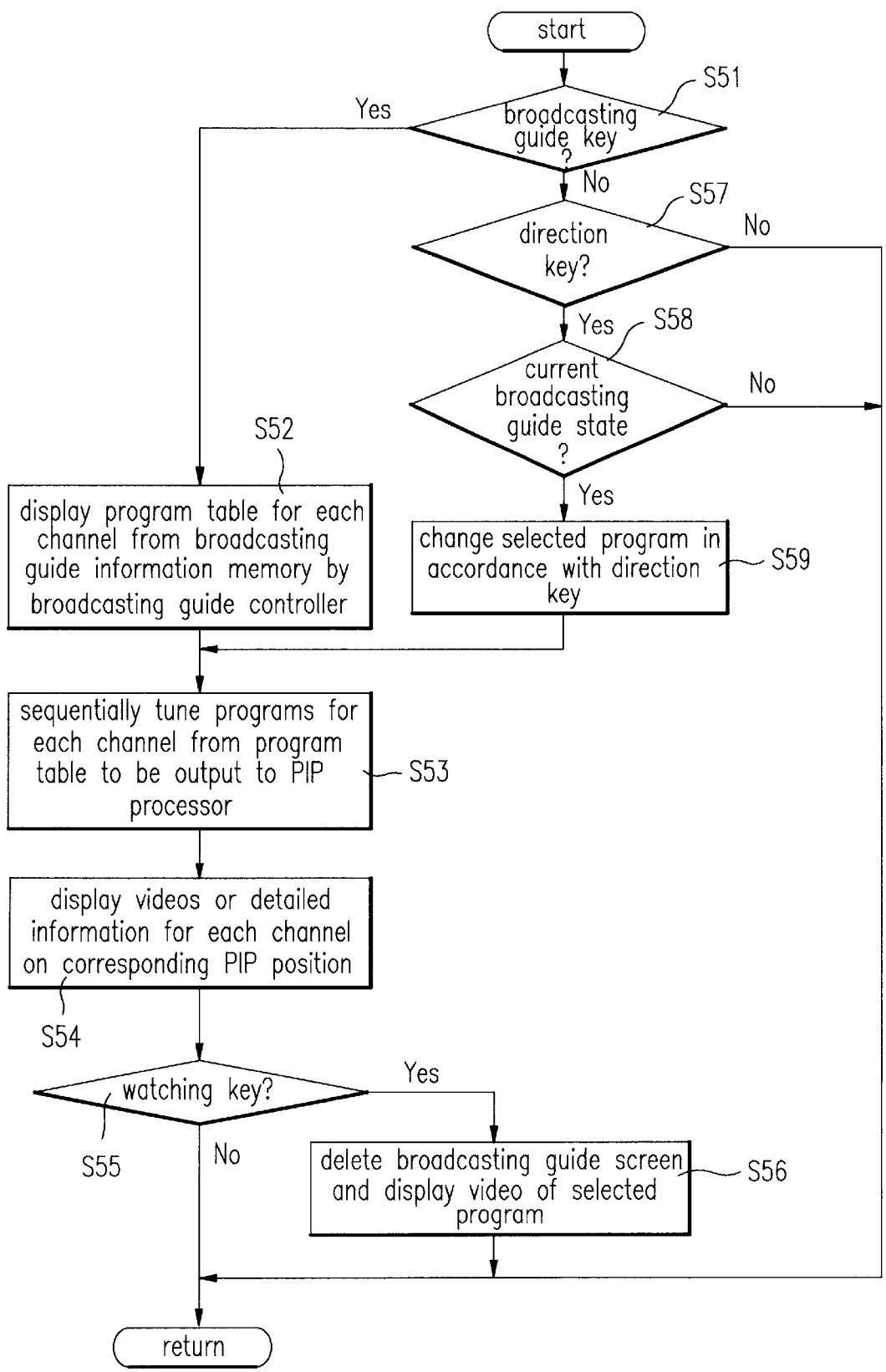
FIG. 7 is a flow chart showing a method for guiding broadcasting information of a TV according to the fifth embodiment of the present invention.
Figure 8:
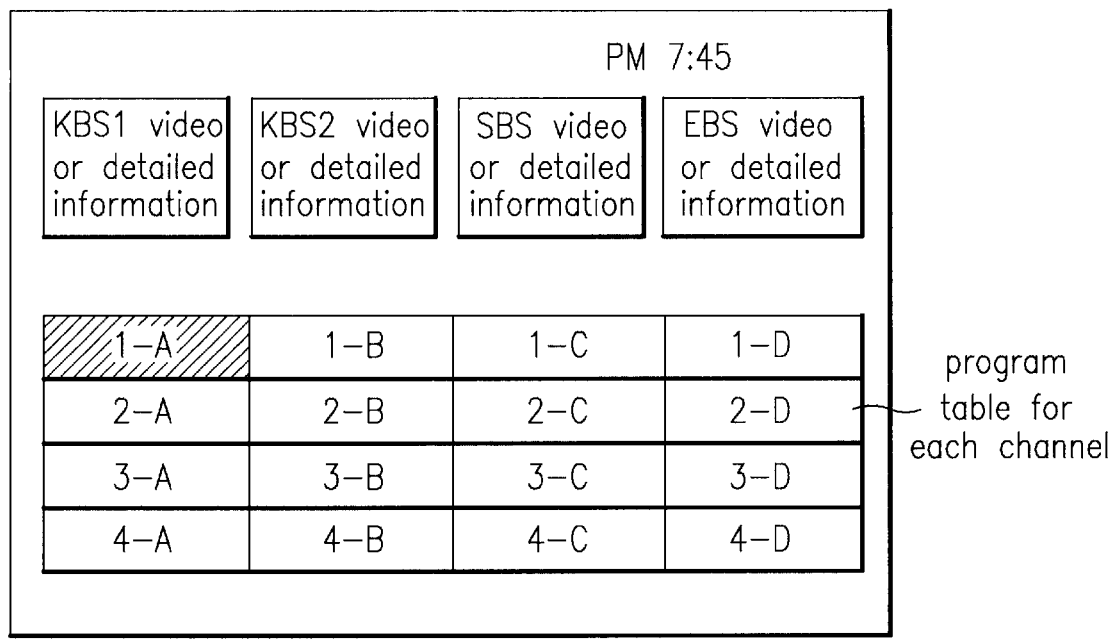
FIG. 8 shows a broadcasting guide screen of FIG. 7.

As shown in FIG. 7, it is determined that a broadcasting guide key is input (step S51). If the broadcasting guide key is input, the broadcasting guide controller 9 reads out broadcasting guide information from the broadcasting guide information memory and displays a program table for each channel as shown in FIG. 8 (step S52). The broadcasting guide controller 9 permits programs for each channel at program broadcasting time selected from the program table for each channel to be sequentially tuned and outputs the programs to the PIP processor 8 (step S53).

Subsequently, the PIP processor 8 processes signals of moment videos of a corresponding program and displays the moment videos or detailed information of the corresponding program on a corresponding position in PIP types, as shown in FIG. 8. (step S54).

At this time, if the program selected by the user is currently broadcasting, the PIP video is displayed as a moving video.

It is then determined that the watching key is input (step S55). If the watching key is input, the broadcasting guide screen is deleted and a video of the corresponding program is displayed (step S56).

Meanwhile, as a result of the step S51, if a direction key is input instead of a broadcasting guide key (step S57) and a current broadcasting guide screen is displayed (step S58), the selected program is changed to be adapted to the direction key (step S59). The step S59 are fed back to the step S53.

As aforementioned, the apparatus and method for guiding broadcasting information of a TV according to the present invention has the following advantages.

Since the videos of the corresponding program as well as detailed character information are displayed, it is possible to fulfill a visual desire of the user. Also, the user can easily recognize the program.

Furthermore, since the user can select its desired program and view it on a broadcasting information guide screen, convenience can be given to the user.

It will be apparent to those skilled in the art that various modifications and variations can be made in the apparatus and method for guiding broadcasting information of a TV according to the present invention without departing from the spirit or scope of the invention. Thus, it is intended that the present invention covers the modifications and variations of the invention provided they come within the scope of the appended claims and their equivalents.

What is claimed is:

1. A method for guiding broadcasting information of a TV, the method comprising the steps of:
   displaying a program table for each broadcasting station and each time in accordance with a broadcasting guide key input by a user; and
   displaying both a PIP video of a current broadcasting program in a channel selected by the user from the program table and one of a PIP video of a previous broadcasting program in the same channel, a PIP video of a next program in the same channel, and PIP videos of previous and next programs in the same channel.

2. The method as claimed in claim 1, wherein the PIP videos are displayed on an upper side or lower side of the program table.

3. A method for guiding broadcasting information of a TV, the method comprising the steps of:
   displaying a program table for each broadcasting station and each time in accordance with a broadcasting guide key input by a user; and
   displaying both a PIP video of a broadcasting program in a channel selected by the user from the program table and one of a PIP video of a broadcasting program in an upper channel at equal time, a PIP video of a broadcasting program in a lower channel at equal time, and PIP videos of broadcasting programs in the upper and lower channels at equal time.

4. The method as claimed in claim 3, wherein the PIP videos are displayed on a right side or left side of the program table.

5. A method for guiding broadcasting information of a TV, the method comprising the steps of:
   displaying a program table for each broadcasting station and each time in accordance with a broadcasting guide key input by a user;
   displaying both a PIP video of a current broadcasting program in a channel selected by the user from the program table and one of a PIP video of a previous broadcasting program in the same channel, a PIP video of a next program in the same channel, and PIP videos of previous and next programs in the same channel; and
   displaying both a PIP video of a broadcasting program in a channel selected by the user from the program table and one of a PIP video of a broadcasting program in an upper channel at equal time, a PIP video of a broadcasting program in a lower channel at equal time, and PIP videos of broadcasting programs in the upper and lower channels at equal time.

6. The method as claimed in claim 5, wherein detailed information of a corresponding program is displayed on a PIP position if there exists no PIP video information for displaying the PIP videos.

7. The method as claimed in claim 6, wherein the PIP video information is composed of main videos for each program and corresponding program titles.

8. The method as claimed in claim 6, wherein the PIP video information is produced by selecting predetermined video information as a main video among broadcasting signals tuned for each channel and sequentially storing it together with a corresponding program title in a memory, and the video information stored in the memory is renewed by periodically comparing an actual program title with a program title stored in the memory to delete a video and a title of an ended program and by storing a video and a title of a new program in the memory.

9. The method as claimed in claim 5, wherein a corresponding PIP is displayed as a moving video type if the broadcasting program of the channel selected by the user is currently broadcasting.

10. The method as claimed in claim 5, wherein the PIP video of the current program in the channel selected by the user, the PIP video of the previous program in the same channel, and the PIP video of the next program in the same channel are displayed in the order of the PIP video of the previous program in the same channel, the PIP video of the current program, and the PIP video of the next program in the same channel.

11. The method as claimed in claim 5, wherein the PIP video of the program in the channel selected by the user, the PIP video of the program in the upper channel at equal time, and the PIP video of the program in the lower channel at equal time are displayed in the order of the PIP video of the program in the upper channel, the PIP video of the program in the channel selected by the user, and the PIP video of the program in the lower channel.

12. A method for guiding broadcasting information of a TV, the method comprising the steps of:
   displaying a program table and PIP videos for each channel which is currently broadcasting in accordance with a broadcasting guide key input by a user; and
   displaying detailed broadcasting guide information of a program selected by the user from the program table.

13. The method as claimed in claim 12, wherein a corresponding PIP video is displayed as a moving video type if the program selected by the user is currently broadcasting.

14. The method as claimed in claim 12, wherein the detailed broadcasting guide information is displayed on a lower side of the program table.

15. The method as claimed in claim 12, wherein the detailed broadcasting guide information is composed of character information containing title and story of the corresponding program.

* * * * *